(12) United States Patent
Bychkov et al.

(10) Patent No.: US 8,836,637 B2
(45) Date of Patent: Sep. 16, 2014

(54) COUNTER-TACTILE KEYPAD

(75) Inventors: Eyal Bychkov, Hod Hasharon (IL); Hagay Katz, Moshav Herut (IL)

(73) Assignee: Google Inc., Mountain View, CA (US)

( * ) Notice: Subject to any disclaimer, the term of this patent is extended or adjusted under 35 U.S.C. 154(b) by 1224 days.

(21) Appl. No.: 12/190,599

(22) Filed: Aug. 13, 2008

(65) Prior Publication Data

US 2009/0046076 A1 Feb. 19, 2009

Related U.S. Application Data

(60) Provisional application No. 60/964,872, filed on Aug. 14, 2007.

(51) Int. Cl.
| | | |
|---|---|---|
| *G09G 5/00* | (2006.01) | |
| *G09F 3/02* | (2006.01) | |
| *G06F 3/041* | (2006.01) | |
| *G06F 3/0489* | (2013.01) | |
| *H04M 1/23* | (2006.01) | |
| *G06F 1/16* | (2006.01) | |

(52) U.S. Cl.
CPC ............. *G06F 3/0489* (2013.01); *H04M 1/236* (2013.01); *G06F 1/1626* (2013.01); *H04M 2250/22* (2013.01)
USPC ............................. 345/156; 345/168; 345/173

(58) Field of Classification Search
USPC ...................... 345/156–184; 178/18.01–20.04
See application file for complete search history.

(56) References Cited

U.S. PATENT DOCUMENTS

| | | | |
|---|---|---|---|
| 5,893,037 A | | 4/1999 | Reele et al. |
| 5,923,325 A | * | 7/1999 | Barber et al. ................. 715/711 |
| 6,297,752 B1 | * | 10/2001 | Ni .................................... 341/22 |
| 6,640,113 B1 | | 10/2003 | Shim et al. |
| 7,088,342 B2 | * | 8/2006 | Rekimoto et al. ............ 345/169 |
| 2002/0090980 A1 | | 7/2002 | Wilcox et al. |
| 2002/0118175 A1 | * | 8/2002 | Liebenow et al. ............ 345/168 |
| 2003/0048205 A1 | * | 3/2003 | He .................................. 341/26 |
| 2004/0208681 A1 | * | 10/2004 | Dechene ....................... 400/472 |
| 2005/0007339 A1 | * | 1/2005 | Sato ............................... 345/156 |
| 2006/0073893 A1 | * | 4/2006 | Dahl .............................. 463/35 |
| 2006/0084482 A1 | | 4/2006 | Saila |

FOREIGN PATENT DOCUMENTS

| | | | |
|---|---|---|---|
| EP | 1653338 A1 | 5/2006 | |
| EP | 1832957 A1 | 9/2007 | |
| GB | 2330981 A1 | 5/1999 | |
| WO | 2006052175 A1 | 5/2006 | |
| WO | 2008028694 A1 | 3/2008 | |

* cited by examiner

*Primary Examiner* — Alexander Eisen
*Assistant Examiner* — Patrick F Marinelli
(74) *Attorney, Agent, or Firm* — Soquel Group LLC

(57) ABSTRACT

A touch-based user interface for an electronic device, including a housing including electronic circuitry, a plurality of buttons mounted within a first area on a first side of the housing, and a screen mounted on a second area of a second side of the housing, the second side being opposite to the first side, and the second area being opposite to at least a portion of the first area, wherein the electronic circuitry is operative (i) to display on the screen at least one user interface control element that corresponds respectively to at least one button, each such user interface control element having a command associated therewith, and (ii) to perform the command associated with a designated user interface control element when its corresponding button is pressed. A method and a computer-readable storage medium is also described and claimed.

9 Claims, 2 Drawing Sheets

COUNTER-TACTILE KEYPAD

PRIORITY REFERENCE TO RELATED APPLICATIONS

This application claims benefit of U.S. Provisional Application No. 60/964,872, entitled COUNTER-TACTILE KEYPAD, filed on Aug. 14, 2007 by inventors Eyal Bychkov and Hagay Katz.

FIELD OF THE INVENTION

The present invention relates to touch-based user interfaces for electronic devices.

BACKGROUND OF THE INVENTION

Handheld electronic devices have benefited from touch screen technology. Touch screens are used for both input and output. They enable device manufacturers to reduce the area of the device used for off-screen input controls, such as buttons and keypads, and to enlarge the screen area, thereby enhancing the user experience.

For input, users interact with touch screens using visual control elements. Control elements correspond to user commands, are displayed on a screen, and provide areas for a user to press on. Control elements may appear as buttons, scroll bars, slide bars and wheels. Users can press or tap on control elements such as buttons, or drag control elements such as scroll bars, slide bars and wheels to a desired location. Pressing, tapping or dragging control elements activates their corresponding commands.

For output, touch screens display graphics, similar to conventional LCD displays.

Reference is now made to FIG. 1, which is a prior art illustration of a touch screen. Shown in FIG. 1 is a handheld electronic device 100 having a touch screen 110. Device 100 displays various buttons 120 in touch screen 110, which a user can press in order to enter numbers and commands.

An advantage of touch screens is the flexibility of displaying a wide variety of control elements, such as buttons, icons and selection menus, for a corresponding wide variety of modes of operation. Thus, while in a dialer mode of operation, a touch screen may display a numeric keypad, and while in an SMS mode of operation, the touch screen may display an alphabet keypad. Areas on the screen thus produce different actions when pressed, depending on the control elements being displayed therein.

A drawback with touch screens is the lack of a tactile feeling, as a result of which many people find them difficult to use. Prior art methods of overcoming this drawback include graphical methods, audio methods, force feedback methods and vibration methods. Graphical methods make control elements appear to be pressed and released, similar to physical buttons presses, thus creating a perception of a physical button press. Audio methods provide sounds in response to elements being pressed. The TouchSense® system of Immersion Corporation of San Jose, Calif., includes both graphical and audio feedback when touch screens are pressed.

Force feedback methods operate by mounting a touch screen on a linear flexure, which allows the screen to bend inwards when pressed. Force feedback for touch screens is described in U.S. Pat. No. 7,113,177 to Franzen. The '177 patent describes a touch-sensitive display with tactile feedback, comprised of three layers; namely, a display layer, a layer that includes receptors, and a layer that includes controllable actuators.

Vibration methods cause a device to vibrate in response to a control element being pressed, as a tactile feedback. Pantech Group of Seoul, Korea, developed such a touch screen for its dual-LCD sliding phones.

SUMMARY OF THE DESCRIPTION

The present invention provides a way to generate tactile feedback for screens that display user interface control elements. The present invention uses both front and back sides of an electronic device; one side for housing a screen, and the other side for housing physical buttons. The screen is positioned substantially opposite the buttons. Pressing a button on the device activates a control element that is displayed opposite the button on the other side of the device.

Four embodiments of the invention are described. In the first embodiment, the screen is a touch screen and the buttons are not electrically connected to the device; i.e. the buttons are merely used for their tactile feedback. In the second embodiment, the screen is a non-touch screen and the buttons are fully functional. In the third and fourth embodiments, the screen is a touch screen and the buttons are fully functional.

There is thus provided in accordance with an embodiment of the present invention a touch-based user interface for an electronic device, including a housing including electronic circuitry, a plurality of buttons mounted within a first area on a first side of the housing, and a screen mounted on a second area of a second side of the housing, the second side being opposite to the first side, and the second area being opposite to at least a portion of the first area, wherein the electronic circuitry is operative (i) to display on the screen at least one user interface control element that corresponds respectively to at least one button, each such user interface control element having a command associated therewith, and (ii) to perform the command associated with a designated user interface control element when its corresponding button is pressed.

There is additionally provided in accordance with an embodiment of the present invention a method for a touch-based user interface for an electronic device, including receiving notification that a user has pressed a button on a first side of an electronic device, and performing a command associated with a control element displayed on a screen on the electronic device, wherein the screen is located on a second side of the electronic device, the second side being opposite to the first side, and wherein the control element is displayed opposite the location of the button that was pressed.

There is moreover provided in accordance with an embodiment of the present invention a computer readable storage medium storing program code for causing an electronic device to receive notification that a user has pressed a button on a first side of the electronic device, and to perform a command associated with a control element displayed on a screen on the electronic device, wherein the screen is located on a second side of the electronic device, the second side being opposite to the first side, and wherein the control element is displayed opposite the location of the button that was pressed.

There is further provided in accordance with an embodiment of the present invention a method for touch-based user interface for an electronic device, including receiving a notification that a user has pressed an area of a touch screen on an electronic device where a control element is displayed, verifying that the user has also pressed an off-screen button corresponding to the control element, and performing a command associated with the control element after and only after the receiving and the verifying have been performed.

There is yet further provided in accordance with an embodiment of the present invention a computer readable storage medium storing program code for causing an electronic device to receive a notification that a user has pressed an area of a touch screen on the electronic device where a control element is displayed, to verify that the user has also pressed an off-screen button corresponding to the control element, and to perform a command associated with the control element after and only after both the receiving and the verifying have been performed.

BRIEF DESCRIPTION OF THE DRAWINGS

The present invention will be more fully understood and appreciated from the following detailed description, taken in conjunction with the drawings in which.

DETAILED DESCRIPTION

The present invention relates to touch-based user interfaces for electronic devices. The present invention uses two opposite sides of the devices; one side for a screen, and the opposite side for physical buttons. The screen is located substantially opposite the buttons.

Figure 1:
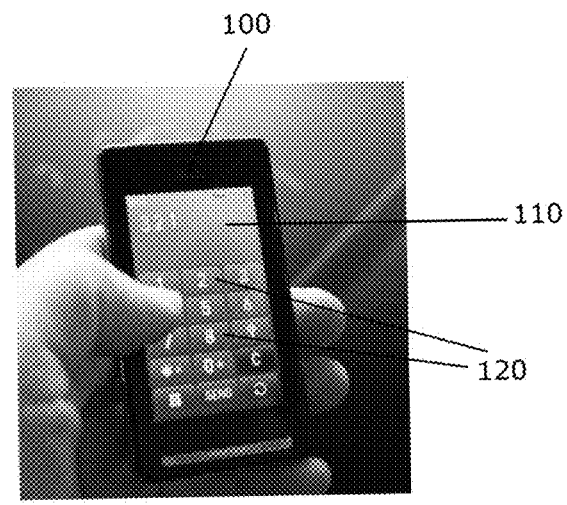
FIG. 1 is a prior art illustration of a touch screen.
Figure 2:
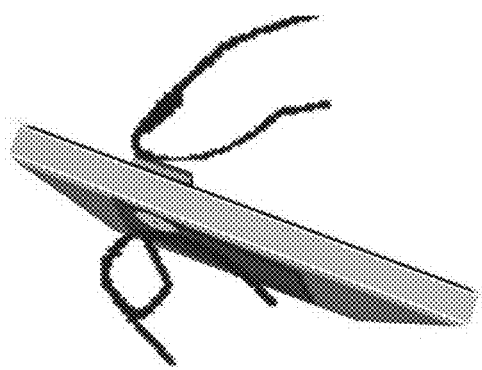
FIG. 2 is an illustration of a touch-based user interface that uses two opposite sides of an electronic device, in accordance with an embodiment of the present invention.

Reference is now made to FIG. 2, which is an illustration of a touch-based user interface that uses two opposite sides of an electronic device, in accordance with an embodiment of the present invention. A user presses a screen on the front side of the device with his thumb, and presses a button on the back side of the device with his index finger. The user's thumb and index finger are aligned substantially opposite one another.

Figure 3:
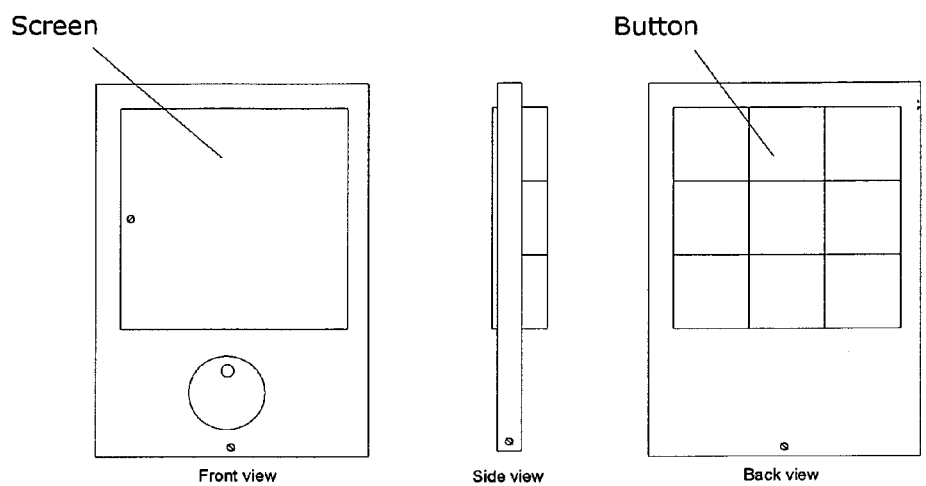
FIG. 3 is a simplified cross-sectional front, side and back view of an electronic device that has a touch-based user interface, in accordance with an embodiment of the present invention.

Reference is now made to FIG. 3, which is a simplified cross-sectional front, side and back view of an electronic device that has a touch-based user interface, in accordance with an embodiment of the present invention. As shown in FIG. 3, a screen is housed on the front side of the device and physical buttons are positioned on the back side of the device. The side view indicates that the buttons protrude from the housing. It will be appreciated by those skilled in the art, however, that the buttons may be flush with or indented in the back surface of the housing.

The screen housed on the front side of the device is positioned in an area that is substantially opposite the area where the buttons are located on the back side of the device.

Figure 4:
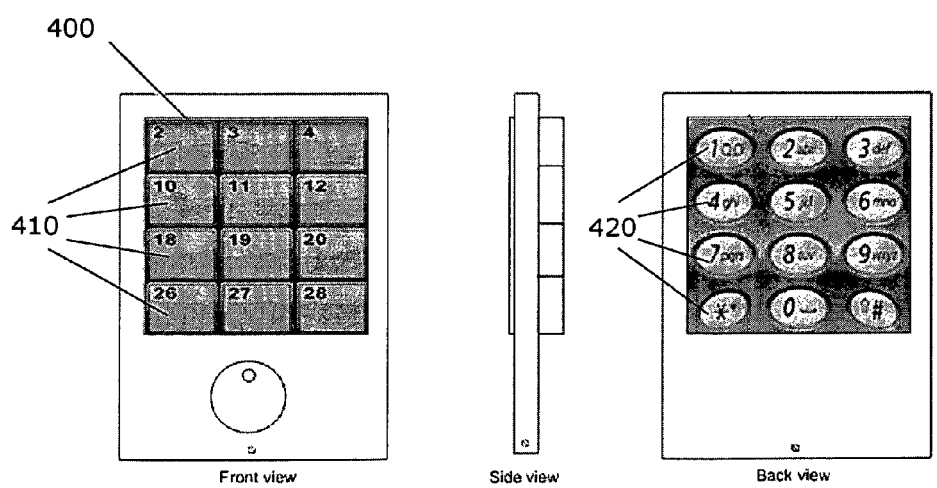
FIG. 4 is an illustration of two opposite sides of an electronic device that has a touch-based user interface, in accordance with an embodiment of the present invention.

Reference is now made to FIG. 4, which is an illustration of two opposite sides of an electronic device that has a touch-based user interface, in accordance with an embodiment of the present invention. Shown in FIG. 4 are control elements 410 displayed on a screen 400 on the front side of the device, and physical buttons 420 positioned on the back side of the device. Each control element 410 on the front side is positioned substantially opposite a corresponding button 420 on the back side. The shapes of buttons 420 need not be the same as those of the areas of their corresponding control elements 410. In FIG. 4, for example, buttons 420 are oval shaped, and their corresponding control elements 410 are rectangular shaped.

When a button 420 on the back side is pressed, a command associated with its corresponding control element 410 on the front side is performed. Thus, to activate a specific control element 410, a user may position his thumb on the control element, and press its corresponding button 420 with his index finger. I.e., pressing on a button 420 on the back side behind the screen corresponds to pressing its corresponding control element 410 on the screen.

A motivation for the present invention is that fact that neurologically people are able to accurately align the tips of their thumbs and index fingers. In fact, neurological diagnoses often incorporate patients' accuracy in arranging their two fingers to touch.

In a first embodiment of the present invention, screen 400 is a touch screen, and buttons 420 are physically functional but not electrically connected to the device. Buttons 420 serve to supplement the touch screen with a tactile effect, with inexpensive mechanical buttons.

In a second embodiment of the present invention, screen 400 is an inexpensive conventional non-touch screen, and buttons 420 are fully functional. Buttons 420 serve to provide the non-touch screen with the flexibility of a touch screen.

The following pseudo-code is a simplified description of the second embodiment, in accordance with the present invention.

```
x=0
if (button == 1)
{
        x = Find_control_element(location == 1);
}
if ((button == 2)
{
        x = Find_control_element(location == 2);
}
.....
if (x>0)
{
        do Control_element_function(X)
}
```

In a third embodiment of the present invention, screen 400 is a touch screen, and buttons 420 are fully functional. In this embodiment, operation of the device is configured so that a control element is activated only when both the control element is touched on the screen and its corresponding button is pressed. The device thus ensures that a user is using two fingers, which is useful in avoiding unintended presses of the screen, and eliminates the need to lock the screen.

The following pseudo-code is a simplified description of the third embodiment, in accordance with the present invention.

```
if (button-only( ) == FALSE)
{
        if ((screen-control-element) == 1) AND (button == 1))
        {
                do Control_element_function 1
        }
        if ((screen-control-element) == 2) AND (button == 2))
        {
                do Control_element_function 2
        }
        .....
        else
        {
```

-continued

```
            do nothing;
        }
    }
    else
    {
        if (button == 1)
        {
            do Control_element_function 1
        }
        if (button == 2)
        {
            do Control_element_function 2
        }
        .....
        else
        {
            do nothing;
        }
    }
}
```

In a fourth embodiment of the present invention, screen 400 is a touch screen, and buttons 420 are fully operational, as in the third embodiment. In this embodiment, operation of the device is configured so that a control element is activated when either the control element is touched on the screen, or when its corresponding button is pressed.

The following pseudo-code is a simplified description of the fourth embodiment, in accordance with the present invention.

```
if (button-only( ) == FALSE)
{
        if ((screen-control-element) == 1) OR (button == 1))
        {
                do Control_element_function 1
        }
        if ((screen-control-element) == 2) OR (button == 2))
        {
                do Control_element_function 2
        }
        .....
        else
        {
                do nothing;
        }
}
else
{
        if (button == 1)
        {
                do Control_element_function 1
        }
        if (button == 2)
        {
                do Control_element_function 2
        }
        .....
        else
        {
                do nothing;
        }
}
```

In all four of the above embodiments, graphical and audio feedback may be incorporated, to notify a user that his action is acknowledged.

In accordance with an embodiment of the present invention, a controller of the device in FIGS. 2-4 is programmed to map each button 420 to a specific area of screen 400. Control elements have buttons associated therewith, and are displayed by the controller on screen 400 at positions within the screen areas to which their buttons map. Different control elements may be displayed in different modes of operation of the device, but for each mode the control elements are positioned within the screen areas to which their buttons map.

In the third embodiment described hereinabove, wherein a control element and its button must both be pressed in order to activate the control element, the controller is programmed to detect both presses before activating the control element.

In accordance with an embodiment of the present invention, the device in FIGS. 2-4 may also be operated in certain cases without the display, in a "button-only" mode. The button-only mode may be activated manually, by a user pressing a "button-only" button, or automatically when the device is held in an orientation with the screen facing down and the buttons facing the user. Such an orientation may be automatically detected by an orientation sensor within the device.

The buttons are engraved with symbols, such as alphanumeric symbols, which represent their default functions. The default button functions are operational when the device is in the button-only mode.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. An electronic device, comprising:
  a housing;
  electronic circuitry contained within said housing;
  an orientation sensor coupled to said electronic circuitry, for detecting an orientation of said housing;
  a button mounted on a first side of said housing and having a symbol engraved thereon, the symbol representing a default function; and
  a screen mounted on a second side of said housing, the second side being opposite the first side,
  wherein said electronic circuitry is operative (i) to dynamically display on said screen at different times, each of two different user interface control elements at a screen location that is substantially opposite the location of said button, each user interface control element having a device command associated therewith, and (ii) to adapt the device so that a press of said button invokes the device command associated with that control elements that is currently being displayed on the second side opposite said button,
  wherein the respective device commands associated with the different user interface control elements relate to different modes of operation of the device, and
  wherein a button-only interface, for which a press of said button activates said button's default function regardless of the displayed user interface control element, is enabled when said orientation sensor detects an orientation of said housing wherein said screen is facing down and said button is facing up.

2. The electronic device of claim 1 wherein said screen comprises a touch screen, and wherein the press of said button at a given time invokes the device command only when said electronic circuitry confirms that the control element that is currently being displayed on the second side opposite said button is being touched at the given time.

3. A method performed by an electronic device, the method comprising:
  receiving, by the electronic device, notification that a user has pressed a button on a first side of the electronic device at a given time, the button having a symbol engraved thereon and the symbol representing a default function;

dynamically displaying each of two different control elements, each having a device command associated therewith, at different times on a screen at a screen location that is substantially opposite the location of the button detecting an orientation of said housing; and invoking the device command associated with that control element that is being displayed at the given time on the second side opposite the button, in response to said receiving, wherein the screen is located on a second side of the electronic device, the second side being opposite the first side, wherein the respective device commands associated with the different user interface control elements relate to different modes of operation of the device, and wherein when said detecting detects that the screen is facing down and the button is facing up, then invoking the button's default function in response to said receiving regardless of the displayed control element.

4. The method of claim 3 further comprising playing an audio sound in response to said receiving.

5. The method of claim 4 wherein the audio sound is the sound of a button being clicked.

6. The method of claim 3 further comprising displaying a video cue on the screen in response to said receiving.

7. The method of claim 6 wherein the video cue is a succession of images showing a button being pushed and released.

8. The method of claim 3 wherein the screen is a touch screen, and wherein said invoking is conditional upon confirming, by the electronic device, that the control element currently being displayed on the second side opposite the button is being touched at the given time.

9. A non-transitory computer readable storage medium storing program code for causing an electronic device to perform a method, the method comprising:

receiving notification that a user has pressed a button on a first side of the electronic device at a given time, the button having a symbol engraved thereon and the symbol representing a default function;

dynamically displaying each of two different control elements, each having a device command associated therewith, at different times on a screen at a screen location that is substantially opposite the location of the button detecting an orientation of said housing; and invoking the device command associated with that control element that is being displayed at the given time on the second side opposite the button, in response to said receiving, wherein the screen is located on a second side of the electronic device, the second side being opposite the first side, wherein the respective device commands associated with the different user interface control elements relate to different modes of operation of the device, and wherein when said detecting detects that the screen is facing down and the button is facing up, then invoking the button's default function in response to said receiving regardless of the displayed control element.

\* \* \* \* \*